United States Patent
Aoki et al.

(10) Patent No.: US 7,529,056 B2
(45) Date of Patent: *May 5, 2009

(54) CONTROL APPARATUS, STORAGE DEVICE, AND HEAD RETRACTING METHOD

(75) Inventors: Takahiro Aoki, Kawasaki (JP); Takeshi Hara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

This patent is subject to a terminal disclaimer.

(21) Appl. No.: 11/588,074

(22) Filed: Oct. 26, 2006

(65) Prior Publication Data

US 2007/0285826 A1 Dec. 13, 2007

(30) Foreign Application Priority Data

Jun. 9, 2006 (JP) ............................. 2006-161020

(51) Int. Cl.
*G11B 21/02* (2006.01)

(52) U.S. Cl. ....................................................... 360/75

(58) Field of Classification Search .................. 360/75, 360/78.04, 97.02, 53
See application file for complete search history.

(56) References Cited

U.S. PATENT DOCUMENTS

| | | | | |
|---|---|---|---|---|
| 5,760,998 A | * | 6/1998 | Berberich et al. ........ | 360/97.02 |
| 5,973,870 A | * | 10/1999 | Boutaghou et al. ............ | 360/53 |
| 6,108,163 A | * | 8/2000 | Boutaghou ................ | 360/97.02 |
| 6,236,527 B1 | * | 5/2001 | Uchiike et al. ................ | 360/75 |
| 6,476,996 B1 | * | 11/2002 | Ryan ........................... | 360/75 |
| 6,683,743 B2 | * | 1/2004 | Gillis et al. .................... | 360/75 |
| 6,771,449 B1 | | 8/2004 | Ito et al. | |
| 6,859,340 B2 | * | 2/2005 | Brittner et al. ................ | 360/75 |
| 6,867,944 B1 | * | 3/2005 | Ryan ....................... | 360/78.04 |
| 6,995,939 B2 | | 2/2006 | Ito et al. | |
| 7,209,310 B1 | * | 4/2007 | Tsai et al. ..................... | 360/75 |
| 7,379,260 B2 | * | 5/2008 | Aoki et al. .................... | 360/75 |
| 7,397,626 B2 | * | 7/2008 | Aoki et al. .................... | 360/75 |
| 7,420,761 B2 | * | 9/2008 | Aoki et al. .................... | 360/75 |
| 2002/0089775 A1 | * | 7/2002 | Gillis et al. .................... | 360/75 |
| 2002/0141101 A1 | * | 10/2002 | Brittner et al. ................ | 360/75 |
| 2007/0291393 A1 | * | 12/2007 | Aoki et al. .................... | 360/75 |

FOREIGN PATENT DOCUMENTS

| | | |
|---|---|---|
| JP | 2000-241442 | 9/2000 |
| JP | 2002-8336 | 1/2002 |
| JP | 2003-346444 | 12/2003 |
| JP | 2005-078767 | 3/2005 |

* cited by examiner

*Primary Examiner*—Fred Tzeng
(74) *Attorney, Agent, or Firm*—Greer, Burns & Crain, Ltd.

(57) ABSTRACT

A fall sensor detects a fall of a storage device. A first moving unit moves the head to a predetermined position on a storage medium when a falling time exceeds a first threshold. A second moving unit retracts the head from the predetermined position to a ramp when the falling time exceeds a second threshold.

12 Claims, 4 Drawing Sheets

200b
DETERMINATION-TIME DATA

| FIRST SLICE DETECTING TIME (ms) | SECOND SLICE DETECTING TIME (ms) |
|---|---|
| xxx | xxx |

CONTROL APPARATUS, STORAGE DEVICE, AND HEAD RETRACTING METHOD

BACKGROUND OF THE INVENTION

1. Field of the Invention

The present invention relates to a technology for retracting a head on a storage medium by detecting a fall of a storage device, with a capability of preventing a degradation of performance due to an erroneous detection of the fall.

2. Description of the Related Art

A magnetic disk drive is mainly used as an auxiliary storage device of a general-purpose computer and for a business-purpose device that requires high-capacity random access data recording. Furthermore, use of the magnetic disk drive as a general household appliance has increased recently, with an advance of digitalization of household appliances and an increase of applications to record data such as audio-visual data as digital data (for example, a hard disk video recorder and a portable music reproducing device).

However, when the magnetic disk drive receives a strong impact due to a fall, a head collides with a disk surface and the disk surface gets scratched, and data reading and writing may become impossible. Particularly, falls of the magnetic disk drive while it is in operation cause the magnetic disk drive to become easily out of order. Therefore, when handling a product that includes a magnetic disk drive for a portable application, an attention had to be paid to avoid giving a strong impact to the product.

Japanese Patent Application Laid-Open No. 2002-8336 discloses a technology that uses a fall sensor to prevent damages caused by falls of the magnetic disk drive and retracts the head from the disk surface when a free fall of the magnetic disk drive is detected.

However, the conventional technology had a problem of degrading the performance of the magnetic disk drive, because the conventional technology simply detects falls of the magnetic disk drive and forcibly retracts the head from the disk surface.

The performance might be degraded because, in some cases, the fall sensor of the conventional technology erroneously detected falls during normal use when the magnetic disk drive was not falling or while carrying the magnetic disk drive, and each time the head was retracted from the disk.

Therefore, preventing degradation of performance of the magnetic disk drive resulted from erroneous detections of falls is becoming a critical issue.

SUMMARY OF THE INVENTION

It is an object of the present invention to at least partially solve the problems in the conventional technology.

A control apparatus according to one aspect of the present invention is for a storage device that retracts a head on a storage medium upon detecting a fall. The control apparatus includes a first moving unit that moves the head to a predetermined position on a storage medium when a falling time exceeds a first threshold; and a second moving unit that retracts the head from the predetermined position to a ramp when the falling time exceeds a second threshold.

A storage device according to another aspect of the present invention retracts a head on a storage medium upon detecting a fall. The storage device includes a first moving unit that moves the head to a predetermined position on a storage medium when a falling time exceeds a first threshold; and a second moving unit that retracts the head from the predetermined position to a ramp when the falling time exceeds a second threshold.

A head retracting method according to still another aspect of the present invention is for retracting a head from a storage medium. The head retracting method includes moving the head to a predetermined position on a storage medium when a falling time exceeds a first threshold; and retracting the head from the predetermined position to a ramp when the falling time exceeds a second threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
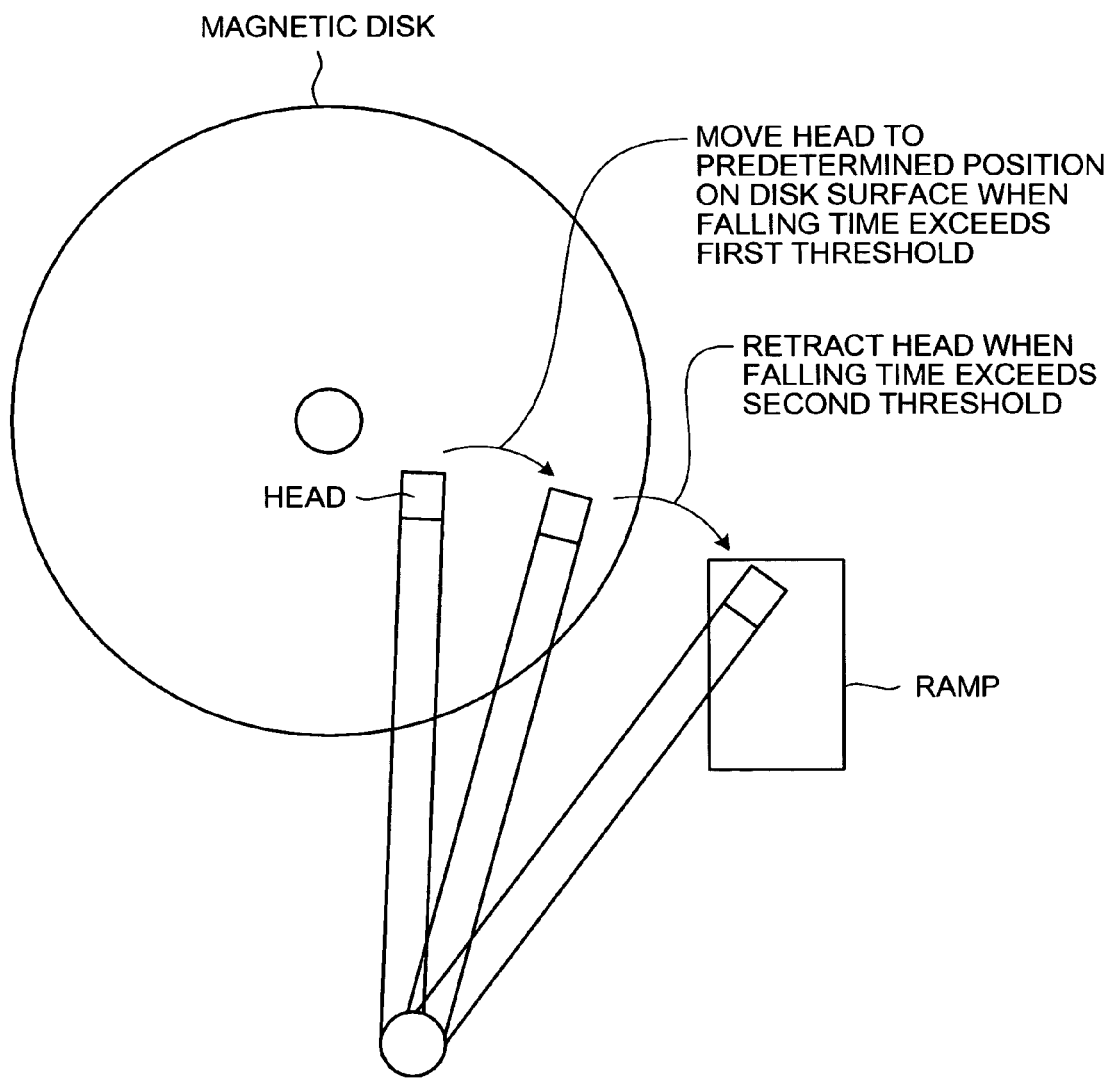
FIG. 1 is a schematic diagram for explaining an outline and features of a magnetic disk drive according to an embodiment of the present invention.

FIG. 1 is a schematic diagram for explaining an outline and features of a magnetic disk drive 100 according to an embodiment of the present invention. As shown in FIG. 1, the magnetic disk drive 100 acquires falling information from a fall sensor that detects falls, the falling information indicating whether the magnetic disk drive 100 is falling. The magnetic disk drive 100 then moves a head to a predetermined position (for example, a fixed cylinder) on the magnetic disk surface when a falling time exceeds a first threshold based on the acquired falling information. The magnetic disk drive 100 retracts the head to a ramp when the falling time exceeds a second threshold (first threshold<second threshold).

In this way, the magnetic disk drive 100 retracts the head from the disk surface in multiple stages. At the stage whether the magnetic disk drive is falling is unclear (in consideration of erroneous detections by the fall sensor), the magnetic disk drive 100 moves the head to the predetermined position on the magnetic disk surface, and at the stage the magnetic disk drive 100 is actually falling, the head is retracted to the ramp. Therefore, performance of the magnetic disk drive 100 can be improved.

In conventional technology, falling information was acquired from the fall sensor and, at that point, whether the magnetic disk drive was falling was determined and the head was retracted to the ramp. Therefore, when the fall sensor erroneously detected falls (the fall sensor might erroneously detect falls with sudden disturbances), the head had to be returned from the ramp to the magnetic disk surface. Consequently, performance of the magnetic disk drive was degraded since the time it took for the magnetic disk drive to record and reproduce was significantly delayed.

However, the magnetic disk drive 100 according to the present embodiment temporarily moves the head to the predetermined position on the magnetic disk surface when the fall sensor detects falls, and the magnetic disk drive 100 can immediately proceed with recording and reproducing when the detection of the fall is turned out to be erroneous. Therefore, the performance can be improved.

Figure 2:
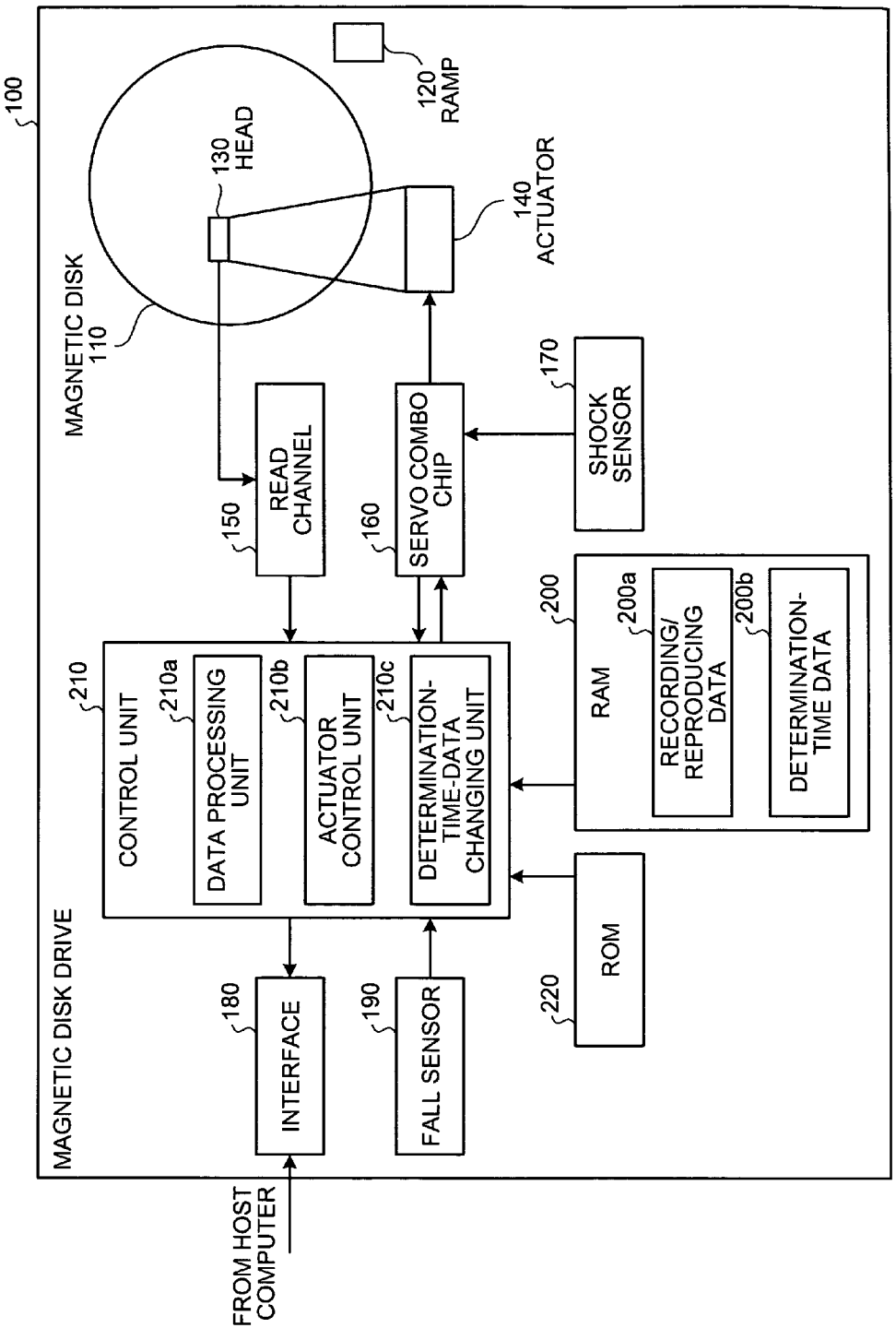
FIG. 2 is a functional block diagram of a configuration of the magnetic disk drive according to the present embodiment.

A configuration of the magnetic disk drive 100 of the embodiments will then be explained. FIG. 2 is a functional block diagram of a configuration of the magnetic disk drive 100. As shown in FIG. 2, the magnetic disk drive 100 is configured to include a magnetic disk 110, a ramp 120, a head 130, an actuator 140, a read channel 150, a servo combo chip 160, a shock sensor 170, an interface 180, a fall sensor 190, a random access memory (RAM) 200, a control unit 210, and a read only memory (ROM) 220. Other configurations are similar to the configurations of a general magnetic disk drive with a Load/Unload method, and will not be explained.

The magnetic disk 110 is a recording medium forming a magnetic film on a metal or glass disk-shaped substrate. To record data on the magnetic disk 110, a magnetic field is radiated from the head 130 to a recording area that records data of the magnetic disk 110, and the magnetization state of the magnetic film of the magnetic disk 110 is changed. To reproduce the data from the magnetic disk 110, the head 130 is moved to a recording area on the magnetic disk 110 to be reproduced and the magnetization state of the magnetic film of the magnetic disk 110 is read.

The magnetic disk 110 is provided with a fixed cylinder (or unload cylinder). When the magnetic disk drive 100 retracts the head 130 to the ramp 120, the magnetic disk drive 100 first moves the head 130 to the fixed cylinder provided at the magnetic disk drive 100, and then retracts the head 130 to the ramp 120. The distance between the position of the fixed cylinder provided at the magnetic disk drive 100 and the position of the ramp 120 is maintained constant. The ramp 120 is a part that stops the head 130 during retractions.

The head 130 is a device that records and reproduces data to and from the magnetic disk 110. The head 130 reads a servo signal that controls a track position, etc, from the magnetic disk 110 and outputs to the read channel 150 the servo signal with reproduction data reproduced from the magnetic disk 110.

The actuator 140 is a device that includes a voice coil motor (VCM) and that moves the head 130 with a control current outputted from the servo combo chip 160. The read channel 150 is a device that acquires reproduction data and the servo signal from the head 130, and outputs the acquired reproduction data and servo signal to the control unit 210.

The servo combo chip 160 is a device that outputs the control current to the actuator 140 following instructions from the control unit 210 and that controls the movement of the head 130. The servo combo chip 160 also outputs the control current to a spindle motor not shown and that controls the rotation of the magnetic disk 110.

The shock sensor 170 is a sensor that detects shocks given to the magnetic disk drive 100. The shock sensor 170 outputs information of the detected shocks to the control unit 210 through the servo combo chip 160.

The interface 180 is a device that controls communication with a host computer not shown in the drawings. The fall sensor 190 is a sensor that detects free falls of the magnetic disk drive 100 in all three-axis (X-Y-Z) directions, and outputs a fall signal indicating whether the magnetic disk drive 100 is falling to the control unit 210.

The RAM 200 is a device that stores data necessary for various processes by the control unit 210, and the RAM 200 deeply related to the present invention stores recording/reproducing data 200a and determination-time data 200b.

The recording/reproducing data 200a is data acquired from the host computer that is to be recorded on the magnetic disk 110 or data reproduced from the magnetic disk 110. The magnetic disk drive 100 first stores the data to be recorded on the magnetic disk 110 and the data to be reproduced from the magnetic disk 110 to the RAM 200.

Figures 3, 4:
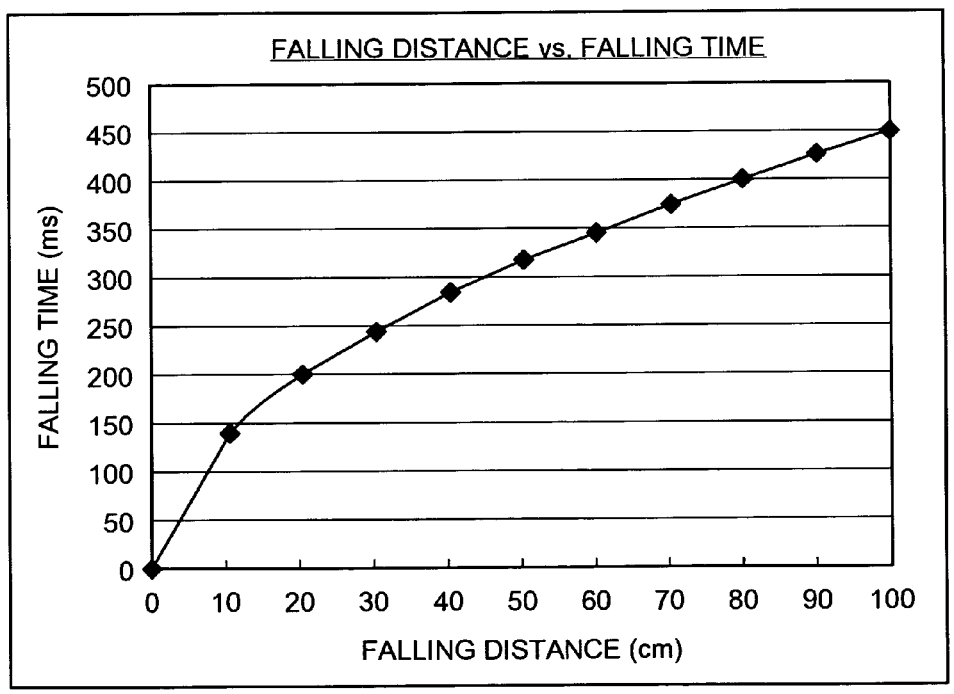
FIG. 3 is a schematic diagram of an example of determination-time data.
FIG. 4 is a graph of a relationship between falling distance and falling time.

The determination-time data 200b includes a first threshold (hereinafter, "first slice detecting time") that determines whether to move the head 130 to the fixed cylinder and a second threshold (hereinafter, "second slice detecting time") that determines whether to move the head 130 from the fixed cylinder to the ramp 120. FIG. 3 is a view of one example of the determination-time data 200b.

When a falling time of the magnetic disk drive 100 exceeds the first slice detecting time of FIG. 3, the head 130 is moved to the fixed cylinder on the magnetic disk surface. When a falling time of the magnetic disk drive 100 exceeds the second slice detecting time of FIG. 3, the head 130 on the fixed cylinder is retracted to the ramp 120.

The first slice detecting time and the second slice detecting time are changed in compliance with a falling distance to be guaranteed. FIG. 4 is a view of a relationship between falling distance and falling time. For example, if a falling distance to be guaranteed is 13 cm, then the falling time is 160 ms. Therefore, the magnetic disk drive 100 adjusts the first slice detecting time and the second slice detecting time to finish retracting the head 130 within 160 ms.

The control unit 210 is a device that executes various processes by using programs and controlling data that provide various procedures recorded in the ROM 220. Particularly, the control unit 210 deeply related to the present invention includes a data processing unit 210a, an actuator control unit 210b, and a determination-time-data changing unit 210c.

The data processing unit 210a is a processing unit that records data acquired from the host computer to the recording/reproducing data 200a. The data processing unit 210a also acquires data (such as data reproduced from the magnetic disk 110) from the recording/reproducing data 200a complying with a request from the host computer and outputs the data to the host computer.

The actuator control unit 210b is a control unit that outputs a control command to the servo combo chip 160 and that moves the head 130 to a predetermined position. Specifically, the actuator control unit 210b acquires falling information from the fall sensor 190 and moves the head to the fixed cylinder when the falling time of the magnetic disk drive 100 exceeds the first slice detecting time (see FIG. 3). The actuator control unit 210b moves the head 130 to the ramp 120 when falling time of the magnetic disk drive 100 exceeds the second slice detecting time (see FIG. 3).

The actuator control unit 210b also moves the head 130 to a predetermined area of the magnetic disk 110 when data recording or reproducing to and from the magnetic disk 110 is conducted.

A determination-time-data changing unit 210c is a processing unit that changes the first slice detecting time and the second slice detecting time of the actuator control unit 210b in compliance with the falling distance to be guaranteed. For example, the determination-time-data changing unit 210c adds predetermined values to the first slice detecting time and the second slice detecting time when the falling distance to be guaranteed becomes greater than a predetermined value and subtracts predetermined values from the first slice detecting time and the second slice detecting time when the falling distance to be guaranteed becomes less than a predetermined value. The data of the falling distance to be guaranteed is input from an input device (not shown) to the magnetic disk drive 100 by an administrator, etc.

Figure 5:
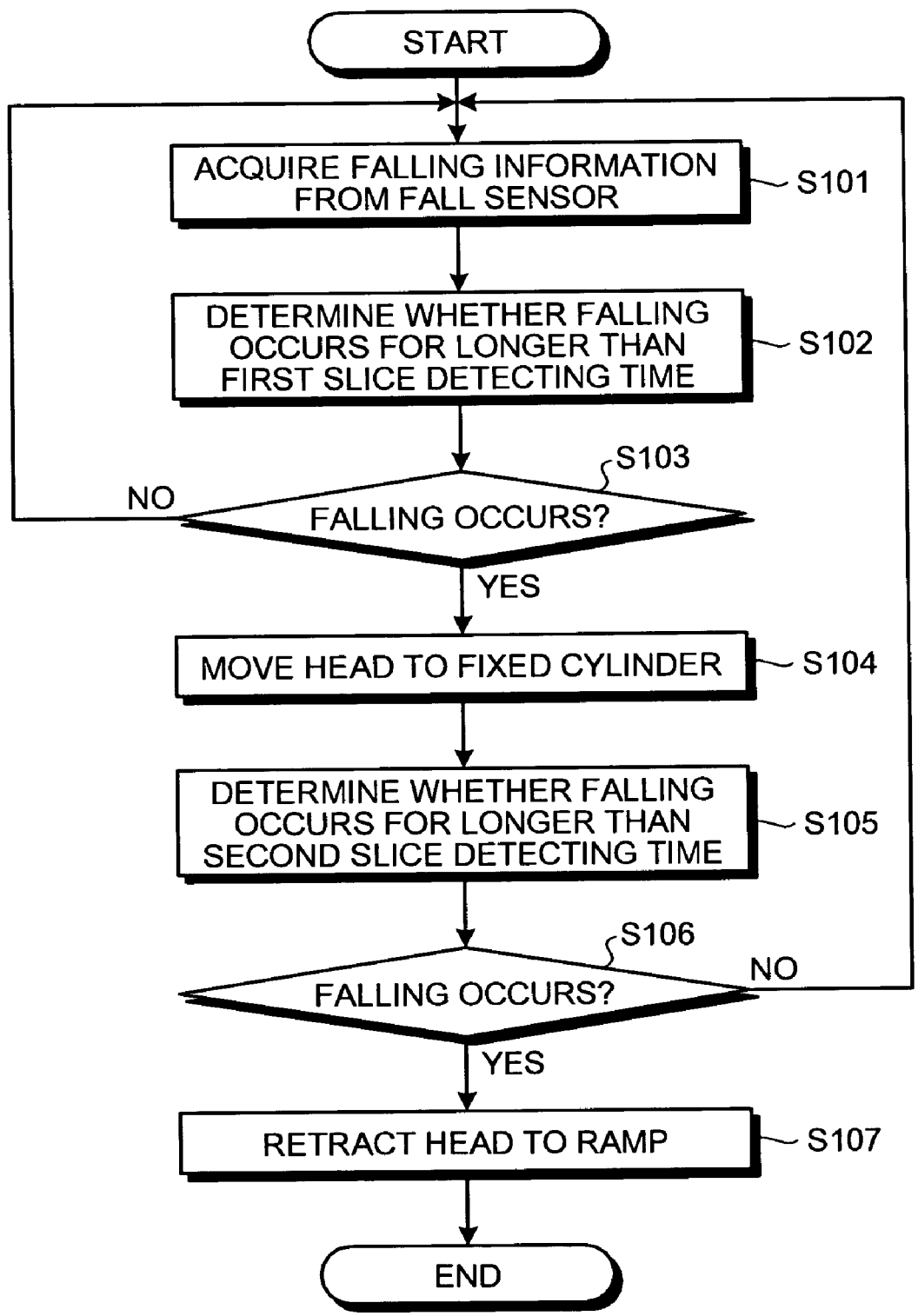
FIG. 5 is a flowchart of a processing procedure of the magnetic disk drive according to the present embodiment.

A process of the magnetic disk drive 100 according to the present embodiment will then be explained. FIG. 5 is a flowchart of a procedure of the magnetic disk drive 100 according to the present embodiment. As shown in FIG. 5, in the magnetic disk drive 100, the actuator control unit 210b acquires falling information from the fall sensor 190b (step S101) and determines whether the magnetic disk drive 100 is falling for longer than the first slice detecting time based on the determination-time data 200b (step S102).

When the magnetic disk drive 100 is not falling for longer than the first slice detecting time (step S103, No), the procedure moves to step S101. When the magnetic disk drive 100 is falling for longer than the first slice detecting time (step S103, Yes), the actuator control unit 210b seeks the head 130 to the fixed cylinder (step S104).

The actuator control unit 210b then determines whether the magnetic disk drive 100 is falling for longer than the second slice detecting time (step S105), and the procedure moves to step S101 when the magnetic disk drive 100 is not falling for longer than the second slice detecting time (step S106, No). When the magnetic disk drive 100 is falling for longer than the second slice detecting time (step S106, Yes), the actuator control unit 210b moves the head from the fixed cylinder to the ramp 120 (step S107).

In this way, degradation in performance of the magnetic disk drive 100 due to erroneous detections by the fall sensor can be prevented since the actuator control unit 210b retracts the head 130 to the ramp 120 in two stages.

As described above, in the magnetic disk drive 100 according to the present embodiment, the actuator control unit 210b acquires the falling information from the fall sensor 190. The actuator control unit 210b then moves the head 130 to the fixed cylinder of the magnetic disk 110 when the falling time of the magnetic disk drive 100 becomes longer than the first slice time and moves the head 130 to the ramp 120 when the falling time of the magnetic disk drive 100 becomes longer than the second slice time. Therefore, efficient responses to the erroneous fall detections by the fall sensor 190 can be possible, and performance of the magnetic disk drive 100 can be improved.

In the magnetic disk drive 100 according to the present embodiment, the actuator control unit 210b retracts the head 130 based on the falling information (information whether the magnetic disk drive 100 is falling) that is binary information. Therefore, manufacturing costs can be reduced since no complex calculation is required and the calculation circuit can be simplified.

In the magnetic disk drive 100, control during retraction of the head 130 can be easily conducted since the distance between the fixed cylinder and the ramp 120 is maintained constant.

The various processes according to the present embodiment can be realized by executing prepared programs with a magnetic disk drive (computer). In the example shown in FIG. 2, the ROM 220 stores various programs that realize the various processes, and various processes that realize the functions of the various control units (data processing unit 210a, actuator control unit 210b, and determination-time-data changing unit 210c) are activated with the control unit 210 reading and executing the various programs stored in the ROM 220.

The various programs are not necessarily to be stored in the ROM from the beginning. For example, the various programs can be stored in "portable physical media" such as a flexible disk (FD), a CD-ROM, a DVD disk, a magneto-optical disk, and an IC card that are inserted to computers, or in "fixed physical media" such as a hard disk drive (HDD) provided inside and outside of computers, or in "other computers (or servers)" that are connected to computers through public lines, Internet, LAN, WAN, etc., and the computers can read the various programs from the media and execute the various programs.

Although the embodiments of the present invention are explained thus far, other than the above embodiments, the present invention can be implemented in different embodiments within the technical scope of the claims.

All or some of the processes in the embodiments that are explained to be executed automatically can be executed manually, or all or some of the processes that are explained to be executed manually can be executed automatically with known methods.

The information including processing procedures, controlling procedures, specific names, and various data and parameters in the above document and drawings can arbitrarily be modified if not otherwise specified.

The components of the devices in the drawings are functional and conceptual, and the components are not necessarily to be physically configured as in the drawings. Specific configurations of distribution and integration of the devices are not limited to the configurations in the drawings, and all or some of the configurations can be configured by functionally or physically distributing and integrating in arbitrary units, in compliance with various loads and usage statuses.

All or arbitrary parts of processing functions conducted by the devices can be realized by a CPU and programs analyzed and executed by the CPU, or can be realized as a hardware with a wired logic.

As describe above, according to an embodiment of the present invention, degradation in performance due to erroneous detections of falls can be suppressed since the head is moved to the predetermined position on the disk surface when the falling time exceeds the first threshold and the head is retracted from the predetermined position on the disk surface when the falling time exceeds the second threshold.

Furthermore, according to an embodiment of the present invention, necessity of a complex calculation of falls is eliminated and the calculation circuit can be simplified since the head is moved to the predetermined position on the disk surface when the falling information indicative of whether the magnetic disk drive is falling is acquired from the fall sensor that detects falls and the falling time exceeds the first threshold based on the falling information.

Moreover, according to an embodiment of the present invention, necessity of a complex calculation of falls is eliminated and the calculation circuit can be simplified since the head is retracted from the predetermined position on the disk surface that is moved by the first moving unit when the falling information indicative of whether the magnetic disk drive is falling is acquired from the fall sensor that detects falls and the falling time exceeds the second threshold based on the falling information.

Furthermore, according to an embodiment of the present invention, the head can be easily retracted since the distance between the predetermined position on the disk surface where the head is moved to and the position where the disk is retracted-to is maintained constant.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for a storage device that retracts a head on a storage medium upon detecting a fall, the control apparatus comprising:
   a first moving unit that moves the head to a predetermined position on a storage medium when a falling time exceeds a first threshold; and
   a second moving unit that retracts the head from the predetermined position to a ramp when the falling time exceeds a second threshold.

2. The control apparatus according to claim 1, wherein
   the first moving unit acquires information indicating whether the storage device is falling from a fall sensor that detects the fall, and moves the head to the predetermined position when the falling time exceeds the first threshold based on the acquired falling information.

3. The control apparatus according to claim 1, wherein
   the second moving unit acquires information indicating whether the storage device is falling from a fall sensor that detects the fall, and retracts the head from the predetermined position to the ramp when the falling time exceeds the second threshold based on the acquired falling information.

4. The control apparatus according to claim 1, wherein
   a distance between the predetermined position and the ramp is kept constant.

5. A storage device that retracts a head on a storage medium upon detecting a fall, the storage device comprising:
   a first moving unit that moves the head to a predetermined position on a storage medium when a falling time exceeds a first threshold; and
   a second moving unit that retracts the head from the predetermined position to a ramp when the falling time exceeds a second threshold.

6. The storage device according to claim 5, wherein
   the first moving unit acquires information indicating whether the storage device is falling from a fall sensor that detects the fall, and moves the head to the predetermined position when the falling time exceeds the first threshold based on the acquired falling information.

7. The storage device according to claim 5, wherein
   the second moving unit acquires information indicating whether the storage device is falling from a fall sensor that detects the fall, and retracts the head from the predetermined position to the ramp when the falling time exceeds the second threshold based on the acquired falling information.

8. The storage device according to claim 5, wherein
   a distance between the predetermined position and the ramp is kept constant.

9. A head retracting method of retracting a head from a storage medium, the head retracting method comprising:
   moving the head to a predetermined position on a storage medium when a falling time exceeds a first threshold; and
   retracting the head from the predetermined position to a ramp when the falling time exceeds a second threshold.

10. The head retracting method according to claim 9, wherein the moving includes
    acquiring information indicating whether the storage device is falling from a fall sensor that detects the fall; and
    moving the head to the predetermined position when the falling time exceeds the first threshold based on the acquired falling information.

11. The head retracting method according to claim 9, wherein the retracting includes
    acquiring information indicating whether the storage device is falling from a fall sensor that detects the fall; and
    retracting the head from the predetermined position to the ramp when the falling time exceeds the second threshold based on the acquired falling information.

12. The head retracting method according to claim 9, wherein a distance between the predetermined position and the ramp is kept constant.

* * * * *